US012789465B2

(12) United States Patent
Gonzalez Martin et al.

(10) Patent No.: US 12,789,465 B2
(45) Date of Patent: Nov. 10, 2026

(54) ANNEALING

(71) Applicant: Peridot Print LLC, Palo Alto, CA (US)

(72) Inventors: Sergio Gonzalez Martin, Sant Cugat del Valles (ES); Ismael Fernandez Aymerich, Sant Cugat del Valles (ES); Manuel Freire Garcia, Sant Cugat de Valles (ES)

(73) Assignee: Peridot Print LLC, Palo Alto, CA (US)

( * ) Notice: Subject to any disclaimer, the term of this patent is extended or adjusted under 35 U.S.C. 154(b) by 309 days.

(21) Appl. No.: 17/758,093

(22) PCT Filed: Jan. 31, 2020

(86) PCT No.: PCT/US2020/016141
§ 371 (c)(1),
(2) Date: Jun. 28, 2022

(87) PCT Pub. No.: WO2021/154284
PCT Pub. Date: Aug. 5, 2021

(65) Prior Publication Data
US 2023/0035587 A1 Feb. 2, 2023

(51) Int. Cl.

| | |
|---|---|
| ***B22F 10/85*** | (2021.01) |
| ***B28B 17/00*** | (2006.01) |
| ***B29C 64/153*** | (2017.01) |
| ***B29C 64/393*** | (2017.01) |
| ***B29C 71/02*** | (2006.01) |
| ***B33Y 50/02*** | (2015.01) |

(52) U.S. Cl.
CPC ............ *B29C 64/393* (2017.08); *B22F 10/85* (2021.01); *B28B 17/0081* (2013.01); *B33Y 50/02* (2014.12)

(58) Field of Classification Search
None
See application file for complete search history.

(56) References Cited

U.S. PATENT DOCUMENTS

| | | | | |
|---|---|---|---|---|
| 7,658,976 | B2 | 2/2010 | Kritchman | |
| 8,563,348 | B2 | 10/2013 | Harris et al. | |
| 9,156,194 | B2 | 10/2015 | Ng et al. | |
| 10,357,957 | B2 | 7/2019 | Buller et al. | |
| 10,406,754 | B2 * | 9/2019 | MacNeish | B33Y 50/02 |
| 12,447,679 | B2 * | 10/2025 | Dorini | B29C 64/343 |
| 2014/0272121 | A1 * | 9/2014 | Ng | B29C 33/3842 427/133 |
| 2015/0273632 | A1 * | 10/2015 | Chen | B22F 12/45 219/76.1 |
| 2017/0113414 | A1 * | 4/2017 | Zeng | G06T 19/20 |

(Continued)

FOREIGN PATENT DOCUMENTS

| | | | | |
|---|---|---|---|---|
| WO | 2017/194111 A1 | 11/2017 | | |
| WO | WO-2018017099 A1 * | 1/2018 | | B29C 64/165 |
| WO | WO-2018022032 A1 * | 2/2018 | | B29C 64/153 |

*Primary Examiner* — Jennifer L Norton
(74) *Attorney, Agent, or Firm* — Law Offices of Michael Dryja; Michael Dryja

(57) ABSTRACT

Disclosed is a method that determines information associated with at least a portion of a build volume that comprises one or more 3D printed objects, and determines an amount of material to be applied to the build volume for use in annealing the one or more 3D printed objects of the build volume, on the basis of the information.

8 Claims, 3 Drawing Sheets

(56) References Cited

U.S. PATENT DOCUMENTS

| | | | | |
|---|---|---|---|---|
| 2017/0129052 | A1* | 5/2017 | Buller | B33Y 10/00 |
| 2017/0266727 | A1* | 9/2017 | Nishino | B22F 10/36 |
| 2018/0111320 | A1 | 4/2018 | Zhao et al. | |
| 2018/0207876 | A1 | 7/2018 | Querol et al. | |
| 2019/0111629 | A1 | 4/2019 | Puigardeu Aramendia et al. | |
| 2019/0152155 | A1* | 5/2019 | Gonzalez | B29C 64/386 |
| 2019/0248078 | A1 | 8/2019 | Domröse et al. | |
| 2021/0008796 | A1* | 1/2021 | Zamorano | B33Y 50/00 |
| 2021/0046710 | A1* | 2/2021 | Koopmans | B33Y 10/00 |
| 2021/0170688 | A1* | 6/2021 | Erickson | B33Y 30/00 |
| 2021/0181714 | A1* | 6/2021 | Gurdiel Gonzalez | B33Y 50/00 |
| 2021/0339475 | A1* | 11/2021 | Gonzalez Martin | B29C 64/393 |
| 2021/0370611 | A1* | 12/2021 | Gurdiel Gonzalez | B29C 64/393 |
| 2022/0161485 | A1* | 5/2022 | Hopkins | B33Y 10/00 |
| 2022/0288861 | A1* | 9/2022 | Dominguez Pastor | B29C 64/393 |
| 2022/0410492 | A1* | 12/2022 | Mansouri | B29C 64/393 |
| 2023/0027565 | A1* | 1/2023 | Gonzalez Martin | B29C 64/393 |
| 2023/0191492 | A1* | 6/2023 | Allen | B33Y 50/00 700/98 |
| 2024/0165873 | A1* | 5/2024 | Gonzalez Martin | A46D 3/00 |

* cited by examiner

ANNEALING

BACKGROUND

Additive manufacturing systems, including those commonly referred to as "3D printers", provide a convenient way to produce three-dimensional objects. These systems may receive a definition of a three-dimensional object in the form of an object model. This object model is processed to instruct the system to produce the object using one or more material components. This may be performed on a layer-by-layer basis in a working area of the system. Generating objects in three-dimensions presents many challenges that are not present with two-dimensional print apparatus.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In the production of three-dimensional objects, e.g. in so-called "3D-printing", there is a challenge to produce objects with measurements that have a higher overall part quality, e.g. smaller variation in densities, internal stresses or mechanical properties. In order to meet part quality objectives, all stages of the process should be consistent. 3D printing systems may produce 3D objects by solidifying successive layers of a build material. The build material may be in the form of a powder comprising, for example, plastic, metal, or ceramic particles.

In powder-based 3D printing systems, after one or more objects have been printed, the build volume goes through an annealing process. The annealing process aims to keep objects within the build volume hot enough as they cool down, to improve part quality compared to rapidly cooling the objects immediately after they are generated. To ensure uniform properties, a number of layers of material (for example build material) are provided on top of the build volume. Each of the layers may have a thickness of between about 50 and 120 microns and around 160 of such layers may be provided. The layers aim to subject all of the objects within the build volume to similar thermal conditions. Energy can be applied to heat the layers. In some example, the energy applied is heat. The heat may be generated by lamps provided above the build volume.

Once the build volume has been heated, the rate of cooling should be controlled to ensure that the object(s) within the build volume are subject to substantially uniform cooling. If the object(s) are subject to non-uniform cooling, this can lead to some objects in the build volume warping and/or becoming dimensionally inaccurate or inconsistent with other objects. The layers of material provided on top of the build volume help to control the cooling profile. However, if too many layers are provided, this may lead to materials (in particular build material) being wasted. Moreover, if too few layers are provided, this may lead to objects within the build volume warping or suffering dimensional inaccuracies.

The following examples provide methods to ensure that a sufficient amount of material for annealing (e.g. a sufficient number of layers of material) is provided on a build volume to prevent or reduce warpage and dimensional inaccuracies while limiting and/or reducing wastage.

Figure 1:
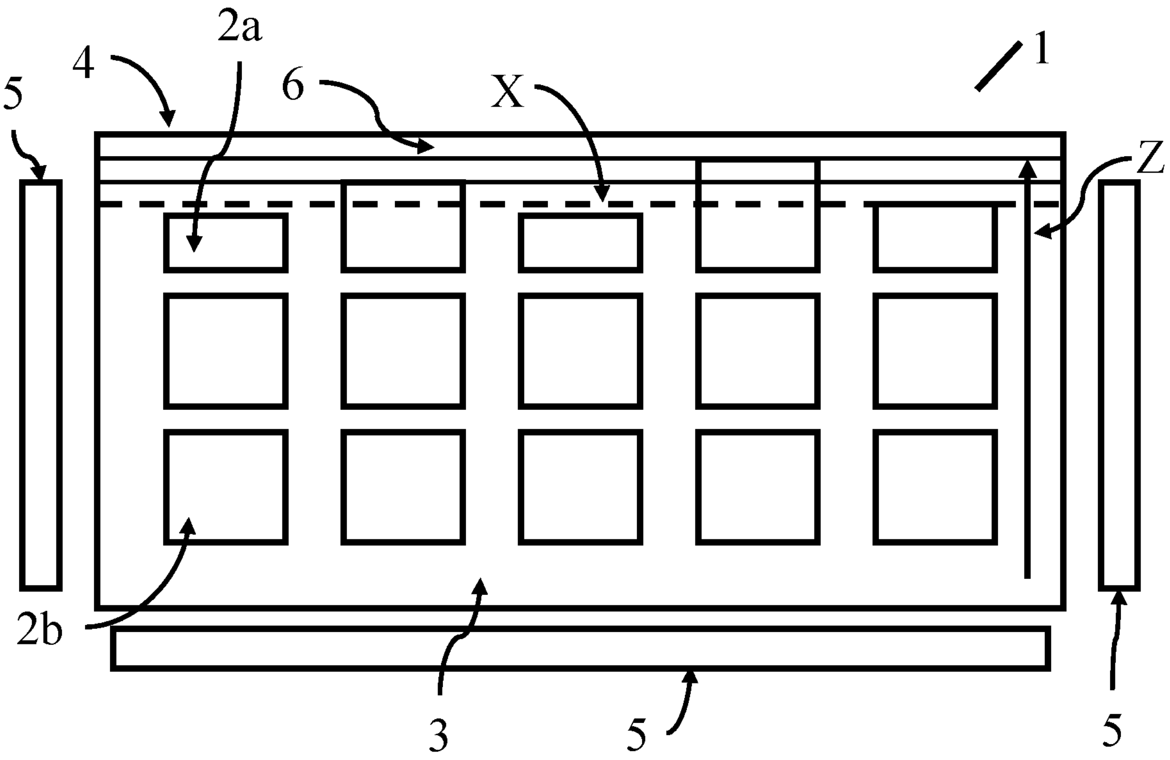
FIG. 1 is a schematic view of a build volume according to one example.

FIG. 1 shows an example of a build volume 1. The build volume 1 comprises at least one object 2 which is formed, in part, by applying a printing agent to a build material 3. More specifically, the build volume 1 is constructed or formed by depositing layers of the build material 3 onto a platform followed by depositing a printing agent in the region(s) of each layer where the at least one object 2 is to be formed. Once the build volume 1 has been formed, the build volume 1 moves to the annealing phase. However, as shown in FIG. 1, the objects 2 which are nearest the upper surface 4 of the build volume 1 may have varying sizes. Consequently, once heated during the annealing phase, these objects 2 will cool at different rates. As discussed above, if uniform cooling is not applied to substantially all of the objects 2, this can lead to inconsistencies in the objects 2 and may case the objects 2 to warp have a different size/shape from each other In order to prevent, or help avoid, the objects 2 from cooling at different rates, one or more layers of material for use in annealing are formed on top of the build volume 1. In some examples, the one or more layers of material may primarily affect the objects 2 which are closest to the upper surface 4 of the build volume. However, if too many layers are provided, material is potentially wasting, whereas providing too few layers may lead to warpage and/or dimensional inaccuracies.

In order to control the rate of cooling of the build volume 1, the build volume 1 may be surrounded by heaters 5. The heaters 5 can help to keep the build volume 1 at a substantially constant temperature and prevent or reduce the likelihood of rapid decreases in temperature which may lead to warping or dimensional inaccuracies. However, due to components of the printer (such as the print heads, recoater, fusing lamps, warming lamps or thermal camera) needing to have access to the upper surface 4 of the build volume 1, it is not possible to provide a heater 5 in this location. As such, objects of the build volume 1 proximate the top surface 4 of the build volume 1 may be subject to a different rate of cooling than the rest of the build volume 1.

Figure 2:
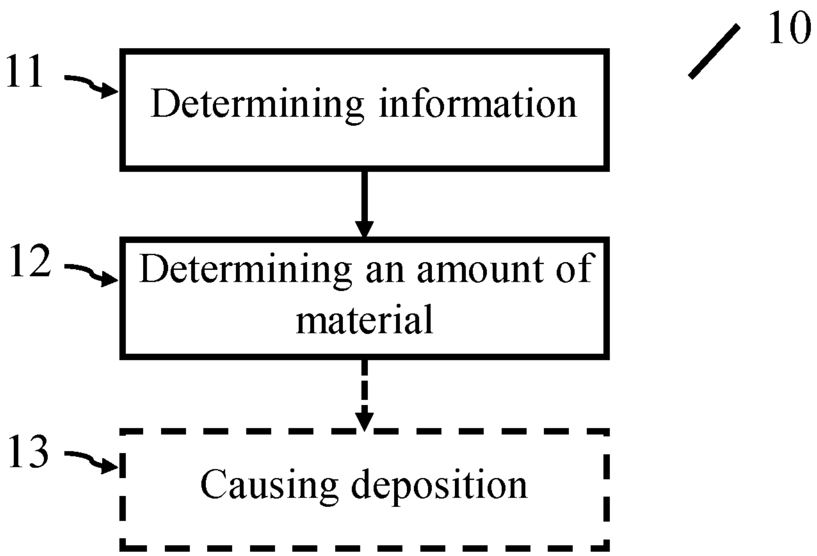
FIG. 2 is a flow diagram of a method according to one example.

FIG. 2 shows a flow chart of a method 10 according to one example. The method comprises determining 11 information associated with at least a portion of a build volume 1 that comprises one or more 3D printed objects 2 and determining 12 an amount of material to be applied to the build volume 1 for use in annealing the one or more 3D printed objects 2 of the build volume 1 on the basis of the information. In some examples, the layers for use in annealing may also be referred to as "annealing layers". By forming the annealing layers based on information associated with the build volume 1, a tailored number of annealing layers can be provided for the specific build volume 1. In some example, the method 10 comprises causing 13 deposition of the amount of material on the build volume 1.

In some examples, the determining 12 the amount of material to be applied to the build volume 1 comprises determining a number of layers of the material to be applied to the build volume 1.

In some examples, the one or more annealing layers comprise build material. For example, the build material of the one or more annealing layers may be the same build material 3 used to form the objects 2. Alternatively, the one or more annealing layers may comprise a different material. Using the same material for the build material 3 and the annealing layers helps to reduce costs and prevents cross-contamination of different materials, meaning that any unused build material 3 can be reused.

In some examples, the information comprises print instructions for the build volume 1. For example, the print instructions may comprise instructions for depositing the build material and/or printing agent. Alternatively or additionally, the information may comprise at least one physical property of the build volume 1. For example, the information may comprise at least one of: a thickness of the build volume 1 in a direction perpendicular to the upper surface 4 and/or the physical properties (e.g. volume) of objects 2 within the build volume 1. In some example, the information may comprise a property of the build material 3. For example, the property of the build material 3 may be a thermal property of the build material 3 such as thermal conductivity. The at least one physical property of the build volume 1 may be determined before the build volume 1 is completed (e.g. from the print instructions).

In some examples, the determining 11 information occurs before the build volume 1 begins to be formed or is formed. For example, the information may be indicative of the final formation of the of the object(s) 2 within the build volume 1, such that the method 10 can be used to determine how many annealing layers are to be used before the printing process begins. Alternatively, the determining 11 may occur once the build volume 1 has started to be formed or has been completed. For example, the determining 11 may comprise analyzing the formed build volume 1 before forming the annealing layers.

In some examples, the information associated with at least a portion of the build volume 1 is information indicative of a part of the build volume 1 that is most, or more, susceptible to warpage. For example, an object 2*a* of the build volume 1 with a smaller height in the Z direction (as shown by the arrow in FIG. 1) may be more susceptible to warpage than an object 2*b* with a larger height in the Z direction. As such, a greater amount/number of layers of annealing material are to be used on top of the object 2*a* with the smaller height in the Z direction to minimize or prevent warpage.

To determine which objects 2 of the build volume 1 are most susceptible to warpage, the method 10 may compare the height of the objects 2 in the Z direction against a predetermined threshold value. The predetermined threshold value may be a value under which warpage is more likely to occur. If an object 2 has a dimension in the Z direction less than the threshold value, it may be considered the most restrictive object and the method 10 may determine the number of annealing layers to be used based on that object 2. For example, the number of annealing layers to be used may be the number to be used to reduce the likelihood of the most susceptible object 2 warping. For example, if more than one object 2 has a height in the Z direction below the threshold value, the method 10 may determine which of the objects 2 has the smallest height in the Z direction (and is therefore most susceptible to warping) and determine the number of annealing layers to be used based on that object 2. In some examples, when determining the objects 2 most susceptible to warpage, the method 10 may determine the objects 2 which are closest to the upper surface 4 of the build volume 1. The objects 2 which are closest to the upper surface 4 (and therefore have fewer layers of material provided on top of them) may cool at a different rate to objects 2 further away from the upper surface 4 as less insulation is provided, making them more susceptible to warpage or dimensional inaccuracies. If the method 10 determines that there is no object 2 with a height in the Z direction lower than the predetermined threshold value, or that no object 2 is too close to the upper surface 4 of the build volume 1, the number of annealing layers may be set to a predetermined minimum value, therefore potentially speeding up the printing process and reducing the amount of annealing material used.

In some examples, the information comprises information indicating a number of empty layers associated with at least a portion of the build volume 1. An empty layer is a layer of build material 3 that is free, or substantially free, from printing agent. In some examples, the at least a portion of the build volume 1 may be a portion of the build volume 1 that is close to an uppermost surface of the build volume 1, closest to the print head. As shown in FIG. 1, the at least a portion of the build volume 1 may be the portion above dashed line X. For example, the at least a portion of the build volume 1 may be about the top 50 mm of the build volume 1. The top of the build volume 1 is taken to be the portion of the volume 1 immediately adjacent the upper surface 4 of the build volume 1. As shown in FIG. 1, the portion of the build volume 1 above dashed line X comprises a number of empty layers 6. These empty layers 6 are formed during printing of the build volume 1 (i.e. before any annealing layers are provided) and help to control the rate of cooling of the objects 2 such that fewer annealing layers are used. The annealing layers are applied on top of these empty layers 6.

In some examples, the information comprises a difference between the number of empty layers associated with at least a portion of the build volume 1 and a predetermined number of layers of material for use in annealing the 3D printed objects 2 of the build volume 1. The predetermined number of layers may be a minimum number of layers that are to be used for the annealing process. As described above with reference to FIG. 1, some empty layers may already be present in the build volume 1 before annealing occurs. Therefore, the number of layers to be used is the result of the predetermined number of layers minus the number of empty layers already present.

By providing a tailored number of layers of material for use in annealing the one or more 3D printed objects 2 of the build volume 1 depending on the build volume 1, the efficiency of the print process may be increased. As such, the cost and time to produce each object 2 may be reduced.

The determining 11 may take place before, during, or after the build volume 1 has been completed or formed. For example, where the information comprises print instructions, the method 10 may comprise determining 11 information associated with at least a portion of the build volume 1 based on the print instructions before the build volume 1 is complete. In some examples, the build volume 1 may be completed and then the determining 11 may take place based on the completed build volume 1, or based on the print instructions.

In some example, the method comprises annealing the build volume 1 by applying energy to the build volume 1. For example, the energy may comprise thermal energy (e.g. heat).

Figure 3:
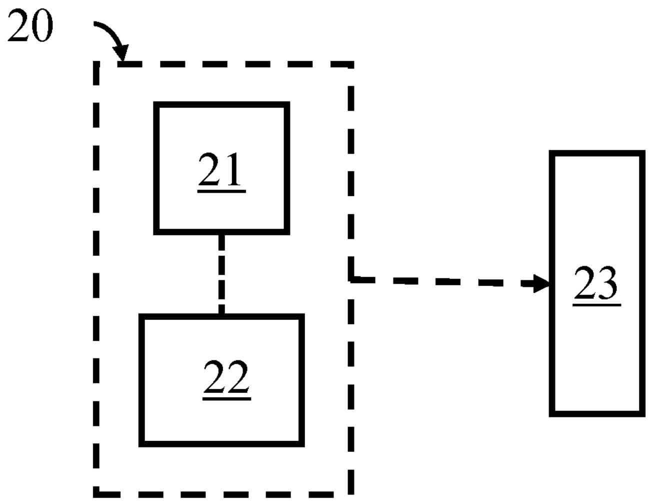
FIG. 3 is a schematic view of an apparatus according to an example.

FIG. 3 shows a schematic view of an apparatus 20 according to one example. The apparatus 20 comprises a controller 21 to determine an amount of material to be applied to a build volume 1 that comprises one or more 3D printed objects 2 for subsequent annealing of the one or more 3D printed objects 2, based on information associated with at least a portion of the build volume 1. In some examples, the controller is to determine a number of layers of the material to be applied to the build volume 1.

As described in relation to method 10 above, in some examples the information comprises print instructions for the build volume 1. Additionally or alternatively, the information may comprise at least one physical property of the build volume 1 and/or object 2.

Figure 4:
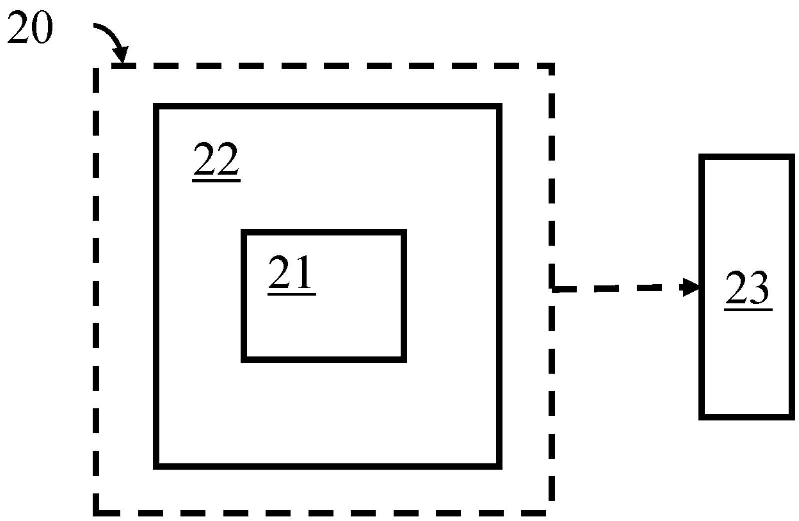
FIG. 4 is a schematic view of an apparatus according to an example.

In some examples, as shown in FIG. 3, the apparatus 20 comprises a printer 22. For example, the printer 22 may be a three-dimensional (3-D) printer. As shown in FIG. 3, the controller 21 is operatively connected to the printer 22. The controller 21 may be provided separately from the printer 22 or may be integrally formed with the printer 22. In some examples, the controller 21 is provided as a standalone module which may be attached to a printer 22. As such, the apparatus 20 may be used to retrofit existing printers 22. In some examples, as shown in FIG. 4, the apparatus 20 comprises a printer 22 that comprises the controller 21. In any event, in some examples, the controller 21 is to perform any of the methods described herein.

In some examples, the controller 21 is to receive print instructions for the build volume 1. The print instructions may be entered via a user interface in communication with the controller 21. In one example, the controller 21 is to determine the property of the annealing material on the basis of the received print instructions. Alternatively, the print instructions may be stored on memory integral to the controller 21 and/or apparatus 20.

In some examples, as shown in FIGS. 3 and 4, the apparatus 20 may be operatively connected to a print control device 23. The print control device 23 may be to control operation of a printer 22. In some examples, the print control device 23 instructs the printer 22 to carry out print instructions. The print control device 23 may be to receive information indicative of a number of layers for subsequent annealing to be applied to a print from the controller 21 of the apparatus 20. In some examples, the print control device 23 may output information to the controller 21 of the apparatus 20. In some examples, the print control device may provide the controller 21 with information associated with at least a portion of the build volume 1. For example, the print control device 23 may provide the controller 21 with information indicative of the print instructions for the build volume 1.

Figure 5:
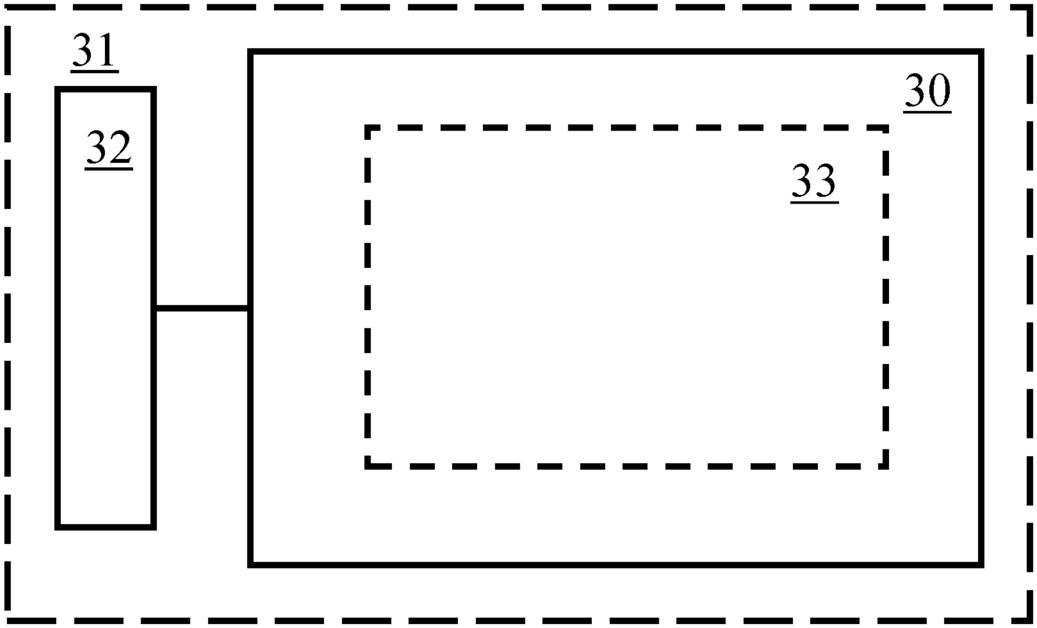
FIG. 5 is a schematic diagram of a non-transitory computer-readable medium according to one example.

FIG. 5 shows a schematic diagram of a non-transitory computer-readable storage medium 30 according to one example. The non-transitory computer-readable storage medium 30 stores instructions 33 that, if executed by a processor 32 of a controller 31, cause the processor 32 to perform one of the methods described herein. The instructions 33 may comprise instructions to perform any of the methods 10 described above with reference to FIG. 2. The controller 31 may be any one of the controllers 21 described herein.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:

determining, by a processor, information associated with at least a portion of a build volume including three-dimensional (3D) objects that are to be printed, have been printed, or are being printed in a fabrication chamber of an additive manufacturing apparatus, the information including a height of each of the 3D objects;

determining, by the processor, a number of annealing layers to be applied to the build volume, wherein a number of empty layers is formed before the number of annealing layers is formed, and wherein the number of annealing layers to be applied is determined based on the height of each of the 3D objects;

after the 3D objects have been printed and the number of empty layers has been formed, causing, by the processor, the additive manufacturing apparatus to apply the number of annealing layers on the number of empty layers; and after the number of annealing layers has been applied, causing, by the processor, the additive manufacturing apparatus to anneal the 3D objects by applying energy at least to the number of annealing layers.

2. The method of claim 1, wherein the information is determined before the build volume is formed.

3. The method of claim 1, wherein the information further includes print instructions for the build volume.

4. The method of claim 1, wherein the information further includes which of the 3D objects that the height thereof is less than a threshold, and wherein the number of annealing layers is determined based on the height of each of the 3D objects in that the number of annealing layers is determined based on which of the 3D objects that the height thereof is less than the threshold.

5. The method of claim 4, wherein the height of each of more than one of the 3D objects is less than the threshold, and wherein the number of annealing layers is determined based on the height of each of the 3D objects in that the number of annealing layers is determined based on the 3D object having a smallest height less than the threshold.

6. The method of claim 4, wherein the height of none of the 3D objects is less than the threshold, and wherein the number of annealing layers is determined based on the height of each of the 3D objects in that the number of annealing layers is set to a predetermined minimum value.

7. A system comprising:

a memory storing instructions; and a processor configured to execute the instructions to perform processing comprising:

determining information associated with at least a portion of a build volume including three-dimensional (3D) objects that are to be printed, have been printed, or are being printed in a fabrication chamber of an additive manufacturing apparatus, the information including a position of each of the 3D objects in the fabrication chamber;

determining a number of annealing layers to be applied to the build volume, wherein a number of empty layers is formed before the number of annealing layers is formed, and wherein the number of annealing layers to be applied is determined based on the position of each of the 3D objects in the fabrication chamber;

after the 3D objects have been printed and the number of empty layers has been formed, causing the additive manufacturing apparatus to apply the number of annealing layers on the number of empty layers; and after the number of annealing layers has been applied, causing the additive manufacturing apparatus to anneal the 3D objects by applying energy at least to the number of annealing layers.

8. A non-transitory computer-readable data storage medium storing instructions executable by a processor to perform processing comprising:

determining information associated with at least a portion of a build volume including three-dimensional (3D) objects that are to be printed, have been printed, or are being printed in a fabrication chamber of an additive manufacturing apparatus, the information including a number of empty layers that is to be deposited, has been deposited, or is being deposited over the 3D objects within the fabrication chamber to control cooling of the 3D objects;

determining a number of annealing layers to be applied to the build volume, wherein the number of empty layers is formed before the number of annealing layers is formed, and wherein the number of annealing layers to be applied is determined based on the number of empty layers that is to be deposited, has been deposited, or is being deposited over the 3D objects to control the cooling of the 3D objects;

after the 3D objects have been printed and the number of empty layers has been formed, causing the additive manufacturing apparatus to apply the number of annealing layers on the number of empty layers; and after the number of annealing layers has been applied, causing the additive manufacturing apparatus to anneal the 3D objects by applying energy at least to the number of annealing layers.

* * * * *